United States Patent
Goto et al.

(10) Patent No.: US 8,436,545 B2
(45) Date of Patent: May 7, 2013

(54) LIGHT SOURCE APPARATUS

(75) Inventors: Kazuhiro Goto, Hyogo (JP); Takashi Yamashita, Hyogo (JP); Kosuke Saka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/064,193

(22) Filed: Mar. 10, 2011

(65) Prior Publication Data
US 2011/0221355 A1 Sep. 15, 2011

(30) Foreign Application Priority Data

Mar. 10, 2010 (JP) .................................. 2010-052912

(51) Int. Cl.
*H05B 41/36* (2006.01)
(52) U.S. Cl.
USPC .......................................... 315/246; 315/307
(58) Field of Classification Search .................. 315/246, 315/307, 291, 224, 194, 209 R, DIG. 7; 353/85
See application file for complete search history.

(56) References Cited

U.S. PATENT DOCUMENTS

| | | | | |
|---|---|---|---|---|
| 7,944,150 B2 * | 5/2011 | Hirao | ............................ | 315/224 |
| 7,960,923 B2 * | 6/2011 | Arimoto et al. | ............... | 315/307 |
| 2006/0125415 A1 | 6/2006 | Geijtenbeek et al. | | |
| 2007/0132403 A1 | 6/2007 | Goto et al. | | |
| 2008/0315782 A1 * | 12/2008 | Hirao | ............................ | 315/224 |
| 2010/0148686 A1 * | 6/2010 | Arimoto et al. | ............... | 315/246 |

FOREIGN PATENT DOCUMENTS

| | | |
|---|---|---|
| JP | 2003-347071 A | 12/2003 |
| JP | 2007-087637 A | 4/2007 |
| JP | 2007-165067 A | 6/2007 |

OTHER PUBLICATIONS

Office Action dated Feb. 28, 2012 from Japan Patent Office for application No. 2010-052912.

* cited by examiner

*Primary Examiner* — Daniel D Chang
(74) *Attorney, Agent, or Firm* — Rader, Fishman & Grauer PLLC

(57) ABSTRACT

In a light source apparatus, an alternating current is supplied to a high pressure discharge lamp from a power supply apparatus to light the lamp. The arrangement state of the lamp is detected by a detection circuit. When the lamp is horizontally arranged, electric energy, whose flow direction is from one electrode of the lamp to the other electrode, is set to be approximately the same as electric energy, whose flow direction is from the other electrode to the one electrode. When the lamp is vertically arranged, while a cycle, which is the same as a polarity change cycle in the horizontal arrangement, is maintained, electric energy, which flows from an upper electrode to a lower electrode, is set to be smaller than electric energy, which flows from the lower electrode to the upper electrode.

6 Claims, 9 Drawing Sheets

FIG.8A

| Electric power ratio | Electric energy ratio | | Shape of electrode | | |
|---|---|---|---|---|---|
| Vertical/Horizontal | Top | Bottom | Upper | Lower | collective |
| 100% | 2 | 8 | — | — | × |
| 100% | 2.5 | 7.5 | — | — | × |
| 100% | 3 | 7 | ○ | △ | ○ |
| 100% | 3.5 | 6.5 | ○ | ○ | ○ |
| 100% | 4 | 6 | ○ | ○ | ○ |
| 100% | 4.5 | 5.5 | ○ | ○ | ○ |
| 100% | 4.8 | 5.2 | △ | ○ | ○ |
| 100% | 5 | 5 | × | ○ | × |
| 100% | 5.5 | 4.5 | × | ○ | × |
| 100% | 6 | 4 | × | ○ | × |

FIG.8B

| Electric power ratio | Electric energy ratio | | Shape of electrode | | |
|---|---|---|---|---|---|
| Vertical/Horizontal | Top | Bottom | Upper | Lower | Total |
| 100% | 4 | 6 | ○ | ○ | ○ |
| 98% | 4 | 6 | ○ | ○ | ○ |
| 96% | 4 | 6 | ○ | ○ | ○ |
| 95% | 4 | 6 | ◎ | ◎ | ◎ |

FIG.8C

| Electric power ratio | Electric energy ratio | | Shape of electrode | | |
|---|---|---|---|---|---|
| Vertical/Horizontal | Top | Bottom | Upper | Lower | Total |
| 95% | 2 | 8 | — | — | × |
| 95% | 2.5 | 7.5 | ○ | × | × |
| 95% | 3 | 7 | ○ | ○ | ○ |
| 95% | 3.5 | 6.5 | ◎ | ○ | ○ |
| 95% | 4 | 6 | ◎ | ◎ | ◎ |
| 95% | 4.5 | 5.5 | ◎ | ◎ | ◎ |
| 95% | 4.8 | 5.2 | ○ | ◎ | ○ |
| 95% | 5 | 5 | × | ◎ | × |
| 95% | 5.5 | 4.5 | — | — | × |
| 95% | 6 | 4 | × | ○ | × |

Horizontal lighting

Vertical lighting

If plus is switched when light is projected through a color wheel (at timing other than color filter area change timing), flicker occurs.

LIGHT SOURCE APPARATUS

CROSS-REFERENCES TO RELATED APPLICATION

This application claims priority from Japanese Patent Application Serial No. 2010-052912 filed Mar. 10, 2010, the contents of which are incorporated herein by reference in their entirety.

TECHNICAL FIELD

The present invention relates to a light source apparatus used for a projector, and specifically relates to a light source apparatus capable of lighting a lamp even when the lamp is either vertically arranged or horizontally arranged.

BACKGROUND

Japanese Patent Application Publication Nos. 2007-165067, 2003-347071, and 2007-087637 respectively disclose light source apparatuses used for a projector apparatus. Such a light source apparatus used for a projector apparatus, which is disclosed in the Japanese Patent Application Publication No. 2007-165067, relates to a light source apparatus having a lamp, which is lighted with alternating current, wherein a color wheel is used for the projector apparatus (for example, refer to paragraph [0013] of the patent application publication). Similarly, the light source apparatus used for a projector apparatus, which is disclosed in the Japanese Patent Application Publication No. 2003-347071, relates to a light source apparatus having a lamp, which is lighted with alternating current.

A lamp of the light source apparatus, which is disclosed in the Japanese Patent Application Publication No. 2003-347071, is lighted, while it is vertically arranged, wherein when the vertically arranged lamp is lighted, time T1, during which voltage is applied to an upper electrode serving as a negative electrode, is longer than time T2, during which voltage is applied to a lower electrode serving as a negative electrode, so that it is possible to suppress a rise in temperature of the upper electrode (for example, refer to paragraph [0029] of the patent application publication). Similarly, the light source apparatus used for a projector apparatus, which is disclosed in the Japanese Patent Application Publication No. 2007-087637, relates to a light source apparatus having a lamp, which is lighted with alternating current, wherein it is possible to prevent generation of an unnecessary projection, by periodically inserting low frequency waveform in stationary frequency (refer to paragraph [0021] of the patent application publication).

In recent years, a projector apparatus is used for advertising media with an image called digital signage, wherein such media are required to be displayed in various directions or at various places because of the nature of advertisement. Naturally, such a light source apparatus for digital signage, is not set in a fixed projecting direction or a fixed projection place, so that a lamp is sometimes required to be horizontally placed as in the prior art to light the lamp, or sometimes the lamp is vertically placed to light the lamp. Thus, it is expected that such a lamp, which is provided in the light source apparatus for digital signage, can be lighted even if it is placed either horizontally or vertically. The light source apparatus disclosed in Japanese Patent Application Publication No. 2007-165067 is designed so that a lamp may be horizontally arranged. When such a lamp is horizontally arranged, a duty ratio of current supplied to the lamp (a ratio of a period, during which the polarity of the current is positive, to a period, during which the polarity of the current is negative, is calls a duty ratio) is in general approximately 1:1, so that electric energy, which flows from one of electrodes of the lamp to the other electrode, is controlled to be approximately equal to electric energy, which flows from the other electrode to the one electrode. In such a light source apparatus disclosed in Japanese Patent Application Publication No. 2007-165067, where the lamp is lighted when the lamp is vertically arranged, heat convection arises inside the lamp so that the temperature of the upper electrode becomes higher than that of the lower electrode. In such a kind of lamp, since the electrode is heated to high temperature (overheated) and, since the electrode is heated by the heat convention, there is a problem that the upper electrode is melted and damaged (lost).

The light source apparatus, which is disclosed in Japanese Patent Application Publication No. 2003-347071, is designed so that a lamp is vertically arranged, and a duty ratio of current supplied to the lamp is not set to 1:1. Thus, when the lamp is horizontally arranged in a state where the duty ratio of the current is not 1:1, there is a problem that one of electrodes is overheated, compared with the other electrode, so that the one of the electrodes may be damaged and lost. Moreover, in some of such light source apparatuses used for a projector apparatus, as shown in Japanese Patent Application Publication No. 2007-16506, light is emitted through a color wheel, which is divided into red (R), green (G), blue (B), and white (W) areas. However, when such a color wheel is used, if the polarity of current to be supplied to the lamp changes in a portion between two adjacent areas of the R, G, B, and W, a ripple arises so that the illumination of light from the lamp becomes high or low (bright or dark) temporarily. FIGS. 9A and 9B show current waveforms, which flow through a lamp of a light source apparatus, and switching timing of areas of a color wheel. Therefore, as shown in FIG. 9A, it is desirable to match switching timing of R/G/B/W areas of such a color wheel with polarity change timing. The light source apparatus, which is disclosed in Japanese Patent Application Publication No. 2003-347071, is designed so that a lamp is vertically arranged, wherein the duty ratio of current supplied to the lamp (a ratio of a positive current period to a negative current period) is not set to 1:1. Therefore, when such a light source apparatus is used for an apparatus, in which a color wheel is used, as shown in FIG. 9B, timing of the current polarity change and switching timing of the R, G, B, and W areas of the color wheel are not necessarily in agreement her. Therefore, due to a ripple, which occurs when the current polarity changes, the illumination of light from the lamp becomes high or low (bright or dark) temporarily, which causes a flicker.

Moreover, although an image on the entire liquid crystal display is updated at a fixed cycle (refresh rate), if change timing of the polarity of current impressed to electrodes of a lamp is not synchronized with the refresh rate (vertical frequency), a flicker may occur as in the case of the above-mentioned color wheel. As disclosed in Japanese Patent Application Publication No. 2003-347071, since the duty ratio of current is not necessarily set to 1:1 as shown in FIG. 9B, the timing, at which an image of the entire liquid crystal display changes and the current polarity change timing are not necessarily in agreement, so that the illumination of light from a lamp may become high or low (bright or dark) temporarily, which causes a flicker, as in the case of the above-mentioned color wheel.

As mentioned above, the light source apparatus of the prior art is not configured so that a lamp can be lighted in either horizontal arrangement or vertical arrangement, so that if a light source apparatus, which is designed to be horizontally placed, is vertically placed and lighted, an electrode located in an upper side may be melt and damaged. Moreover, as disclosed in Japanese Patent Application Publication No. 2003-347071, it is proposed that a lamp can be used in vertical arrangement, by setting a period, during which the polarity of current supplied to the lamp is positive to be different from a negative current period. However, when a color wheel or a liquid crystal display is used, current polarity change timing is not necessarily in agreement with the change timing of the R/G/B/W areas of the color wheel, or the refreshment timing of a liquid crystal display, so that there is a problem that a flicker occurs on the screen.

The present invention was made to solve the above mentioned problem of the prior art, and it is an object of the present invention to offer a light source apparatus capable of lighting a lamp without the problem of damages (or loss) of electrodes in either horizontal or vertical arrangement. It is another object of the present invention to offer a light source apparatus capable of displaying an image without a flicker on a screen even though the light source apparatus is applied to an apparatus using a color wheel or a liquid crystal display.

SUMMARY

In view of the above, the present invention is set forth below.

A light source apparatus comprising a high pressure discharge lamp that includes an electric discharge container that encases mercury and a pair of electrodes arranged to face each other; and a power supply apparatus that supplies an alternating current to the high pressure discharge lamp, wherein the power supply apparatus sets a ratio A/B of an electric energy B, which flows to one electrode from the other electrode, to an electric energy A, which flows from the one electrode to the other electrode, to a first value to supply the alternating current when a signal indicating a state where the lamp is horizontally arranged is inputted or sensed, wherein the power supply apparatus sets an electric energy that flows from an electrode arranged in a lamp upper side to an electrode arranged in a lamp lower side to be smaller than electric energy that flows from the electrode arranged in the lower side to the electrode arranged in the upper side when a signal indicating a state where the lamp is vertically arranged is inputted or sensed, and that sets a ratio A'/B' of electric energy B', which flows from the electrode arranged in the lower side to the electrode arranged in the upper side, to electric energy A', which flows from the electrode arranged in the upper side of the lamp to the electrode arranged in the lower side, to a second value that smaller than the first value while a cycle that is the same as a polarity change cycle in the state where the lamp is horizontally arranged is maintained, and wherein setting the ratio A'/B' to a smaller value than a/b supplies the alternating current.

In the light source apparatus, the alternating current may be supplied when the signal indicating a state where the lamp is vertically arranged is inputted or sensed, so that the ratio of electric energy B', which flows from the electrode arranged in the upper side to the electrode arranged in the lower side, to electric energy A', which flows from the electrode arranged in the lower side to the electrode arranged in the upper side is set to 3/7 to 8/5.2.

In the light source apparatus, an inputted electric power in the case where the signal indicating the state where the lamp is vertically arranged may be 95% or less of an inputted electric power in the case where the signal indicating the state where the lamp is horizontally arranged.

To solve the above-mentioned problem, in the present invention, a ratio of electric energy, which flows from one of electrodes of a lamp to the other electrode thereof, to electric energy, which flows from the other electrode to the one of the electrodes, is changed depending on the arrangement of the lamp. Namely, when the lamp is horizontally arranged (when a pair of electrodes is horizontally arranged), a ratio A/B of electric energy B, which flows from the one of the electrodes of the lamp to the other electrode, to electric energy A, which flows from the other electrode to the one of electrodes, is set to a first value (a≦b), and alternating current is supplied thereto. Moreover, when the lamp is vertically arranged (when the pair of electrodes is vertically arranged, that is, in an up-and-down direction (the gravity direction), the electric energy, which flows from the electrode arranged in an upper side of the lamp to the electrode, which is arranged in a lower side thereof, is set so as to be smaller than electric energy, which flows from the electrode arranged in the lower side to the electrode arranged in the upper side, and while a polarity change cycle is maintained so as to be the same as that at time when the lamp is horizontally arranged, a ratio A'/B' of electric energy B', which flows from the electrode arranged in the lower side to the electrode arranged in the upper side, to electric energy A', which flows from the lamp electrode arranged in the upper side to the electrode arranged in the lower side, is set to a second value, which is smaller than the first value, thereby supplying alternating current thereto. Here, the polarity change cycle of the current, which flows into the above-mentioned lamp, is desirably set so as to be in agreement with switching timing of areas of a color wheel or timing of refreshment of a liquid crystal display, as described above. However, the change of the areas of the above-mentioned color wheel does not necessarily occur at a fixed interval. For example, as shown in FIGS. 7A and 7B, which will be explained later, periods of R, G, B and W areas may be different from one another. Even in such case, it is desirable to perform the polarity change of lamp current according to area switching timing of the color wheel. Moreover, even if the arrangement direction of the lamp is changed, it is desirable to maintain the polarity change cycle of the lamp so as to be the same as each other. Therefore, according to the present invention, the lamp can be lighted in vertical arrangement, while the same cycle as the polarity change cycle in horizontal arrangement is maintained. In addition, in the present invention, even in case of waveforms shown in FIGS. 7A and 7B, which will be explained later, if such two waveforms have the same repeating pattern as each other, in which positive and negative value periods T, T1, T2, . . . in the waveforms are respectively equal to each other, they are referred to waveforms having the same cycle.

BRIEF DESCRIPTION OF THE DRAWINGS

Other features and advantages of the present light source apparatus will be apparent from the ensuing description, taken in conjunction with the accompanying drawings, in which:

FIGS. 8A, 8B, and 8C respectively show an experimental result; and

DESCRIPTION

Figure 7A:
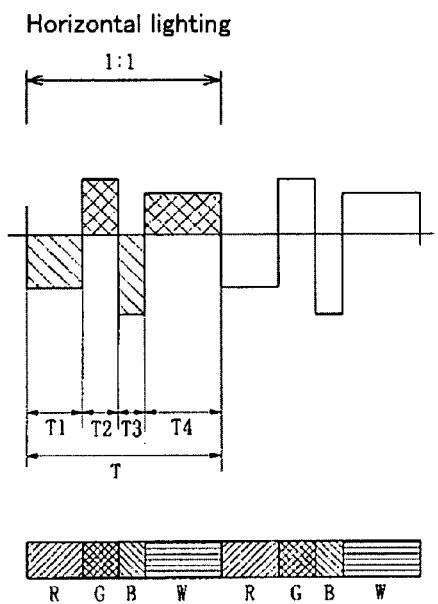
FIGS. 7A and 7B show a second example of current waveforms, which flow through a lamp of a light source apparatus, and switching timing of areas of a color wheel.
Figure 7B:
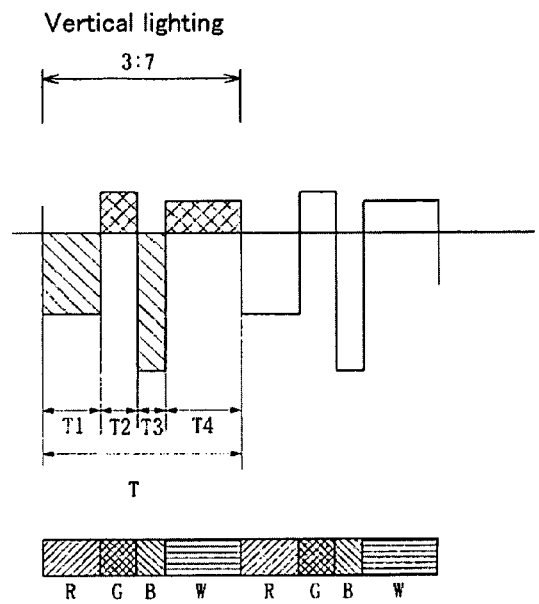
Figure 9A:
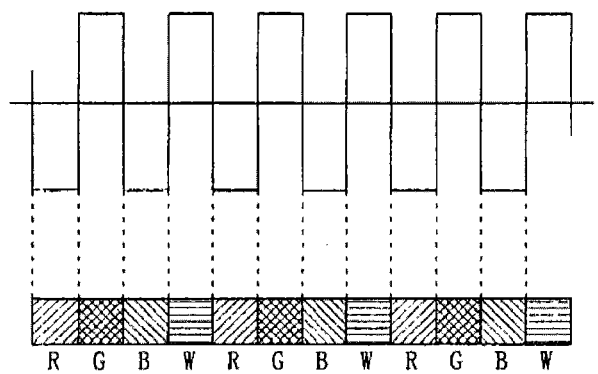
FIGS. 9A and 9B show current waveforms, which flow through a lamp of a light source apparatus, and switching timing of areas of a color wheel.
Figure 9B:
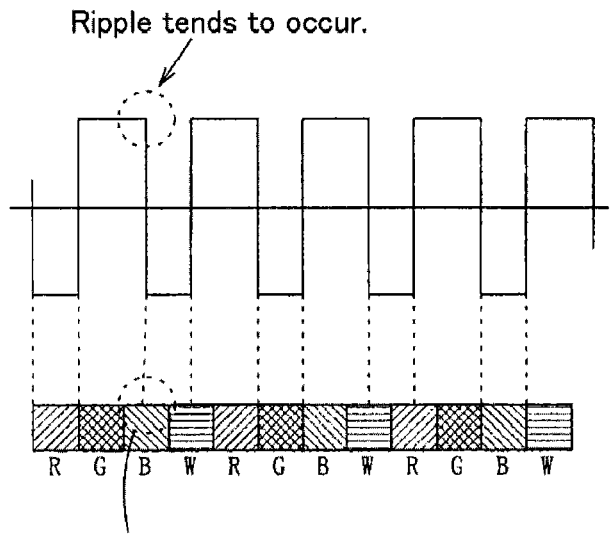

To solve the above-mentioned problem, in the present invention, a ratio of electric energy, which flows from one of electrode to the other electrode, to electric energy, which flows from the other electrode to the one of the electrode, is changed depending on the arrangement of the lamp. Namely, when the lamp is horizontally arranged (when a pair of electrodes is horizontally arranged), a ratio A/B of electric energy B, which flows from the one of the electrodes of the lamp to the other electrode, to electric energy A, which flows from the other electrode to the one of the electrodes, is set to a first value (a≦b), and alternating current is supplied thereto. Moreover, when the lamp is vertically arranged (when the pair of electrodes is vertically arranged, that is, in an up-and-down direction, a.k.a. the gravity direction), the electric energy, which flows from an electrode arranged in an upper side of the lamp to an electrode arranged in a lower side, is set to be smaller than electric energy, which flows from the electrode arranged in the lower side to the electrode arranged in the upper side, and while a polarity change cycle is maintained to be the same as that at time when the lamp is horizontally arranged, a ratio A'/B' of electric energy B', which flows from the electrode arranged in the lower side to the electrode arranged in the upper side, to electric energy A', which flows from the lamp electrode arranged in the upper side to the electrode arranged in the lower side, is set to a second value, which is smaller than the first value. Thus, the alternating current is supplied. Here, the polarity change cycle of the current, which flows into the above-mentioned lamp, is desirably set to be in agreement with switching timing of areas of a color wheel or timing of refreshment of a liquid crystal display, as described above. However, the change of the areas of the above-mentioned color wheel does not necessarily occur at a fixed interval. For example, as shown in FIGS. 7A and 7B, which will be explained later, periods of R, G, B, and W areas may be different from one another. Even in such case, it is desirable to perform the polarity change of lamp current according to area switching timing of the color wheel. Moreover, even if the arrangement direction of the lamp is changed, it is desirable to maintain the polarity change cycle of the lamp to be the same. Therefore, according to the present invention, the lamp can be lighted in vertical arrangement, while the same cycle as the polarity change cycle in horizontal arrangement is maintained. In addition, in the present invention, even in the case of the waveforms shown in FIGS. 7A and 7B, which will be explained later, if such two waveforms have the same repeating pattern as each other, in which positive and negative value periods T, T1, T2, . . . in the waveforms are respectively equal to each other, they are referred to waveforms having the same cycle.

Thus, the effects set forth below can be acquired according to the present invention.

When the lamp is horizontally arranged and the ratio A/B is set to the first value to supply alternating current thereto, and when the lamp is vertically arranged with the electric energy that flows from the electrode arranged in the lamp upper side o the electrode arranged in the lamp lower side is smaller than the electric energy that flows from the electrode in the lamp lower side to the electrode arranged in the lamp upper side while a polarity change cycle is maintained to be the same as that at time when the lamp is horizontally arranged and the ratio A'/B' is set to the second value which is smaller than the first value, thereby supplying alternating current, it is possible to light the lamp without causing damage to or loss of the electrodes in either horizontal or vertical arrangement.

Further, since the lamp may be changed from horizontal arrangement to vertical arrangement or from vertical arrangement to horizontal arrangement while a polarity change cycle is maintained to be the same, where the light source apparatus is applied to an apparatus using a color wheel or a liquid crystal display, it is possible to match current polarity change timing with area switching timing of the color wheel or refresh rate of the liquid crystal display, so that an image can be displayed without producing a flicker on a screen, irrespective of an arrangement state.

Furthermore, when the lamp is vertically arranged, since the ratio A'/B' may be set to 3/7 to 4.8./5.2, the life span characteristic of the lamp can be improved. And since the electric power of a vertically arranged lamp may be set to 95% or less of the electric power of a horizontally arranged lamp the heating of both electrodes can be suppressed where the lamp is vertically arranged, so that degradation in shape of the electrodes of the lamp can be effectively suppressed.

Figure 1:
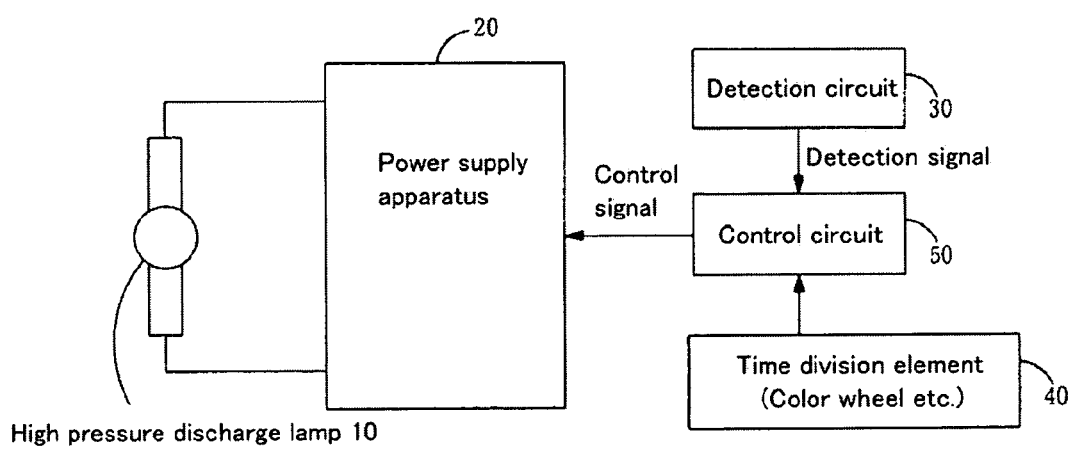
FIG. 1 is a block diagram of a light source apparatus according to an embodiment of the present invention.

FIG. 1 is a block diagram of a light source apparatus according to an embodiment of the present invention. As shown in FIG. 1, the light source apparatus comprises a high pressure discharge lamp 10; a power supply apparatus 20, which is electrically connected to a pair of electrodes provided in the lamp 10; a control circuit 50, which outputs a control signal to the power supply apparatus 20; a detection circuit 30, which outputs a signal indicating a state of the lamp 10 (horizontal arrangement or vertical arrangement) to the control circuit 50; and a time division element 40, which outputs a time division signal for switching timing of an area of a color wheel, or for a refresh rate of a liquid crystal, to the control circuit 50. For example, pendulum element may be used for the detection circuit 30, which detects the arrangement direction of the lamp 10. That is, the pendulum element may change the inclination according to the arrangement state of the lamp (horizontal or vertical arrangement) so that the inclination of this pendulum element is detected and the arrangement state of the lamp (horizontal or vertical arrangement) is discovered. Moreover, a piezo-electric element, which generates an output according to the lamp installation state, or a switch, which opens and closes according to it, may be provided on a wall face or a bottom face of the light source apparatus, wherein when the light source apparatus is installed so that the lamp may be horizontally arranged a first piezo-electricity element generates an output or the switch is turned on and when the light source apparatus is installed so that the lamp may be vertically arranged, the arrangement direction of the lamp may be detected by configuring a second piezo-electricity element to generate an output or a switch to be turned on. It is not indispensable to provide the above-mentioned detection circuit. If a changeover switch is provided, a user may change a switch according to the arrangement state of the lamp. For example, a user may check the arrangement state by viewing the lamp, and input the state (information) into the light source apparatus with a remote controller. Thus, a receiving circuit that receives a signal from the remote controller is provided in the control circuit 50 in place of the detection circuit.

Figure 2:
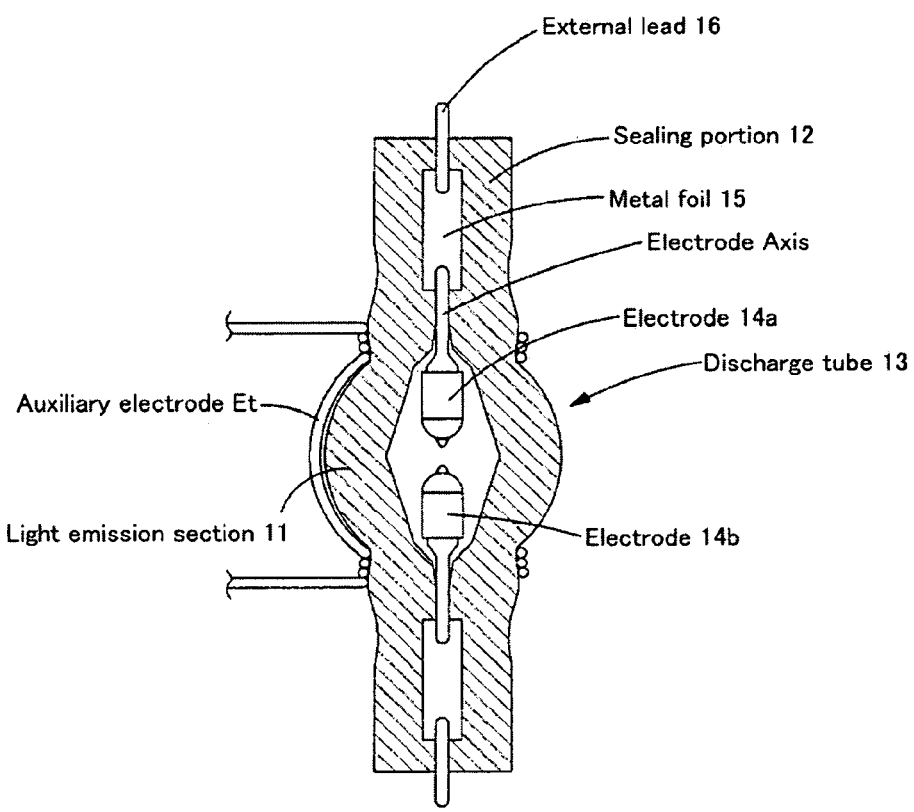
FIG. 2 is a cross sectional view of a lamp that is installed in a light source apparatus according to an embodiment of the present invention.

FIG. 2 is a cross sectional view of a lamp that is installed in a light source apparatus according to an embodiment of the present invention. The high pressure discharge lamp 10 comprises a discharge tube 13, which is made up of a spherical light emission section 11 and cylindrical sealing portions 12; a pair of electrodes 14*a* and 14*b* arranged to face each other inside the light emission section 11; metallic foils 15, which are electrically connected to the respective electrodes 14*a* and 14*b* and which are buried in the respective sealing portions 12; and external leads 16 that project from the respective sealing portions 12 and that are electrically connected to the respective metallic foils 15. Moreover, an auxiliary electrode Et, to which high voltage is impressed at start-up time of lighting of the lamp, is provided on an outer circumference portion of the light emission section 11. Mercury, rare gas, and halogen gas are enclosed in the light emission section 11. The mercury is enclosed to obtain a wavelength of a required visible light, for example, a radiation light whose wavelength is 360 nm-780 nm, and the mercury amount enclosed is 0.15 mg/mm$^3$ or more. Although the enclosed amount also varies depending on temperature conditions, it is possible to realize a discharge lamp whose mercury vapor pressure is 200 atmosphere or more, or 300 atmosphere or more at time of lighting. Thus, it is possible to realize a light source in which luminance is further improved as the mercury vapor pressure becomes higher.

For example, approximately 13 kPa of argon gas is enclosed, as the rage gas therein, to improve the lighting starting nature. Iodine, bromine, chlorine, etc. are enclosed as halogen in form of a compound with mercury or other metal. The enclosed amount of halogen is selected from a range of $1 \times 10^{-6}$ μmol/mm$^3$ to $1 \times 10^{-2}$ μmol/mm$^3$. Although halogen is to extend a lamp life span by the so-called halogen cycle, the halogen also prevents devitrification of an electric discharge container when the discharge lamp is very small and the lighting vapor pressure is very high, as in the high pressure discharge lamp of the present invention. A numerical example (specification) of a discharge lamp is set forth below. For example, the maximum outer diameter of the light emission section is 9.5 mm, and the distance between the electrodes is 1.5 mm. The internal volume of the light emission section is 75 mm$^3$. The rated voltage applied is 70 V, and the rated power applied is 200 W.

Figure 3:
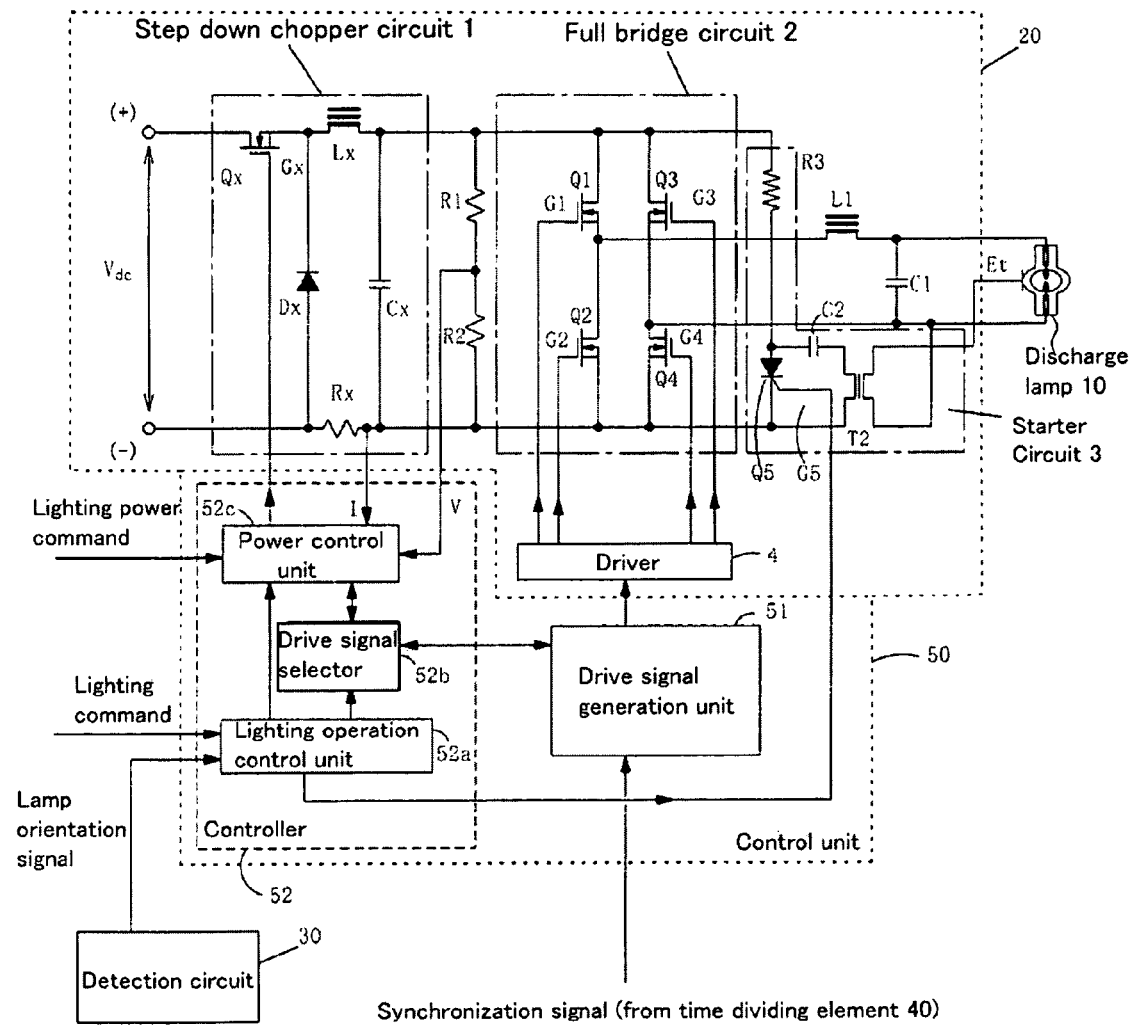
FIG. 3 shows a circuit configuration of a light source apparatus according to an embodiment of the present invention.

FIG. 3 shows a circuit configuration of a light source apparatus according to an embodiment of the present invention. A power supply apparatus 20 comprises a step down chopper circuit 1 to which direct-current voltage is supplied; a full bridge type inverter circuit 2 (hereinafter referred to as a "full bridged circuit"), which is connected to an output side of the step down chopper circuit 1 and which converts direct current voltage to alternating current voltage to supply it to a discharge lamp 10; a coil L1, which is in series connected to the discharge lamp 10; a capacitor C1; a starter circuit 3; and a driver 4, which drives switching elements Q1-Q4 of the full bridged circuit 2. The control unit 50 may be configured by a processing unit, such as a microprocessor. In FIG. 3, a function of the control unit 50 is shown as a block.

As shown in FIG. 3, the step down chopper circuit 1 comprises a switching element Qx and a reactor Lx, which are connected to a plus terminal of a power supply, to which the direct current voltage is supplied; a diode Dx, whose cathode side is connected to a connecting point between the switching element Qx and the reactor Lx and whose anode side is connected to a minus terminal of the power supply; a smoothing capacitor Cx, which is connected to an output side of the reactor Lx; and a resistor Rx for current detection, which is connected between a minus terminal of the smoothing capacitor Cx and the anode side of the diode Dx. By driving the switching element Qx at a predetermined duty ratio, the input direct current voltage Vdc is stepped down to a certain voltage according to the duty ratio. A series circuit of resistors R1 and R2 for voltage detection is provided in an output side of the step down chopper circuit 1. The full bridge circuit 2 is made up of the switching elements Q1-Q4 connected to one another to form a bridge, in which a pair of the switching elements Q1 and Q4 and a pair of the switching elements Q2 and Q3 are turned ON by turns, so that square wave alternating voltage occurs between a contacting point of the switching elements Q1 and Q2 and the switching elements Q3 and Q4.

The starter circuit 3 includes a series circuit made up of a resistance R3, a switching element Q5, a capacitor C2, and a transformer T1. When the switching device Q5 is turned on, charges accumulated in the capacitor C2 are discharged through the switching device Q5 and a primary coil of the transformer T2, to generate high voltage pulse in the secondary coil of the transformer T1. This high voltage is applied to the auxiliary electrode Et of the discharge lamp 10, thereby turning on the lamp 10.

In the above-mentioned circuit, control of output electric power and adjustment of electric energy that flows from one lamp electrode to the other electrode, and electric energy that flows from the other electrode to the one lamp electrode can be attained by adjusting an operational duty of the switching element Qx of the step-down chopper circuit 1. The switching device Qx of the step-down chopper circuit 1 is turned on/off in response to the duty of the gate signal Gx, so that the power to be supplied to the lamp 10 is changed. In other words, the gate signal Gx is controlled to match an input power adjusting signal value. For example, if the power is increased, then the duty of the switching device Qx is increased. If the power is decreased, then the duty of the switching device Qx is decreased. Moreover, similarly, adjustment of the electric energy, which flows from the one electrode to the other electrode, and the electric energy that flows from the other electrode to the one electrode is also attained by changing the above-mentioned duty for every polarity change of the lamp adjust electric energy.

The control unit 50 is made up of a drive signal generation unit 51 and a controller 52. The drive signal generation unit 51, for example, is made up of a processor, and generates a drive signal for driving the switching elements Q1-Q4 of the full bridged circuit 2. The polarity change cycle of the discharge lamp 10 can be adjusted by controlling a drive signal outputted from the drive signal generation unit 51 in response to a synchronization signal (a synchronization signal from a color wheel, or a synchronization signal from a liquid crystal drive circuit) given from the time division element 40 shown in FIG. 1, and by adjusting the switching cycle of the switching elements Q1-Q4 of the full bridged circuit 2. The controller 52 is provided with a lighting operation control unit 52*a*, which controls a lighting operation of the lamp 10 in response to a lighting command or an output from the lamp arrangement direction detection circuit, and a drive signal selector 52*b*, which receives an output of the drive signal generation unit 51. Moreover, an electric power control unit 52*c* is provided, wherein electric power for the lamp is controlled in response to a lighting electric power command from the outside, and wherein electric energy, which flows from the one electrode to the other electrode, and electric energy, which flows from the other electrode to the one electrode, is controlled in response to a signal indicating the arrangement direction of the lamp 10, which is given from the detection circuit 30 for detecting the arrangement direction of the lamp.

The electric power control unit 52c detects lamp current I from voltage between both ends of the resistor Rx for current detection, and lamp voltage V from voltage detected by the resistors R1 and R2 for voltage detection, whereby lamp electric power is calculated, wherein the duty ratio of the switching element Qx of the step down chopper circuit 1 is controlled, so that the electric power is in agreement with a predetermined electric power command value. The full bridged circuit 2 performs a polarity reversal operation in response to a drive signal from the driver 4. Moreover, the drive signal selector 52b receives a polarity switching signal of the discharge lamp from the drive signal generation unit 51, and sends this polarity switching signal to the electric power control unit 52c. Then, the electric power control unit 52c controls the electric energy, which flows from the one electrode to the other electrode, and the electric energy, which flows from the other electrode to the one electrode, in response to this polarity change signal.

Next, a description of the control of the above mentioned light source apparatus at time of lighting will be given below. The detection circuit 30 detects a state of the lamp (horizontal arrangement or vertical arrangement) according to the arrangement state of the discharge lamp 10, and outputs the result to the control circuit 50. The control circuit 50 performs control according to whether the lamp 10 is horizontally or vertically arranged, as set forth below.

Horizontal Arrangement (Horizontal Lighting)

When the lamp 10 is horizontally arranged, since the pair of electrodes is provided to face each other in the horizontal direction in the high pressure discharge lamp 10, the electrodes are heated in approximately the same degree due to a heat convection produced inside an arc tube. For this reason, when alternating current is supplied to the electrodes (so that the electric energy, which flows from the one electrode to the other electrode, and the electric energy, which flows from the other electrode to the one electrode, may become approximately the same as each other) the pair of electrodes is heated up in approximately same degree, so that when the heating of only one of these electrodes is suppressed it is possible to suppress damage to these electrodes.

Figures 4A, 4B:
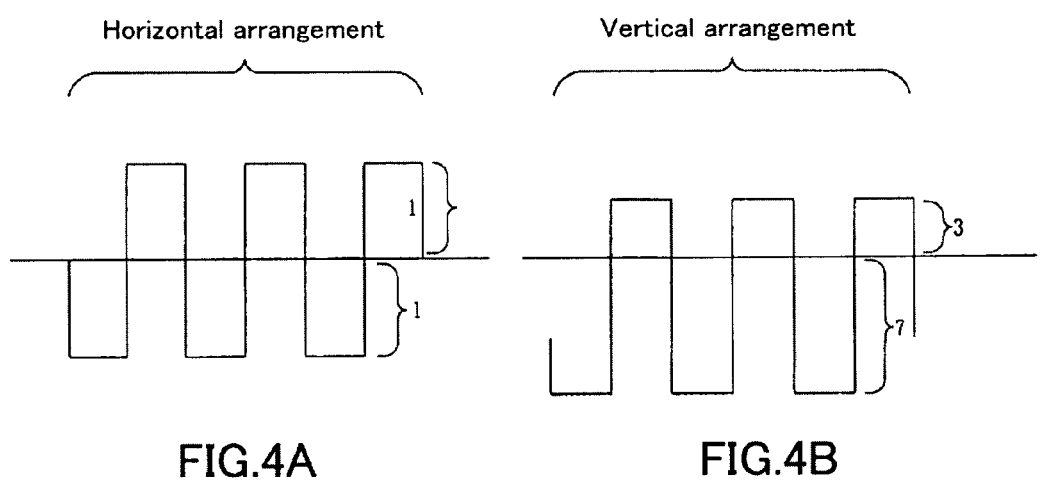
FIGS. 4A and 4B respectively show current waveforms, which flow through a lamp, where the lamp is vertically arranged and where the lamp is horizontally arranged.

For this reason, when a signal, which indicates a state where the lamp 10 is horizontally arranged, is inputted in the control circuit 50 from the detection circuit 30, as shown in FIG. 4A, the control circuit 50 controls the power supply apparatus 20, so that the electric energy, which flows from the one electrode to the other electrode, and the electric energy, which flows from the other electrode to the one electrode, may become approximately the same. That is, the control circuit 50 performs control so that the ratio A/B of the electric energy B, which flows from the other electrode of the lamp 10 to the one electrode, to the electric energy A, which flows from the one electrode to the other electrode of the lamp 10, may be set to approximately 1. In addition, when the voltage impressed to the lamp is approximately constant, the above-mentioned electric energy is approximately proportional to the current that flows between the electrodes of the lamp. FIGS. 4A and 4B respectively show current waveforms, which flow through a lamp, where the lamp is vertically arranged and where the lamp is horizontally arranged. Further, FIGS. 4A and 4B respectively show current waveforms that flow between the electrodes of the lamp, wherein when the lamp voltage is approximately constant the current waveform is approximately in agreement with electric power waveform, and when the lamp electric power is controlled by constant power control so that the electric power may be constant the amplitude of current waveform becomes approximately constant.

In the circuit shown in FIG. 3, as mentioned above, the electric power control unit 52c of the control unit 50 controls the switching element Qx of the step down chopper circuit 1 according to a signal given from the detection circuit 30, which indicates that the lamp 10 is horizontally arranged, so that the electric energy, which flows from the one electrode to the other electrode, and the electric energy, which flows from the other electrode to the one electrode, may become approximately the same. Moreover, where a synchronization signal from the time division element 40 is given to the drive signal generation unit 51 of the control unit 50, the drive signal generation unit 51 drives the driver 4 according to the synchronization signal, thus to controlling a switching cycle of the switching elements Q1-Q4 of the full bridged circuit 2 and performing the polarity change of the electric power, which flows through the lamp 10, in synchronization with the synchronization signal. As a result, alternating current is supplied so that the electric energy, which flows from the one electrode to the other electrode, and the electric energy, which flows from the other electrode to the one electrode, may become approximately the same.

Generally, the lamp 10 is provided with a reflective mirror for reflecting light from a lamp, wherein the light, which is emitted from a portion between the electrodes of the lamp, is reflected by the reflective mirror and guided in a light emitting direction. When the lamp is arranged so that a pair of electrodes of the lamp may become parallel to the light emitting direction of the reflective mirror, even if the lamp is horizontally arranged, the electrode that is in the light emitting direction side (one of the pair of electrodes of the lamp, which is provided far from the mirror) receives the light reflected by the reflective mirror and sets getting hotter than the electrode in the mirror side (one of the pair of electrodes, which is provided near the mirror). That is, even if the lamp is horizontally arranged, one of the electrodes may be heated more than the other electrode. In this case, it is desirable that electric energy, which flows from the electrode located in the mirror side to the other electrode, be made different from electric energy, which flows from the other electrode to the electrode located in the mirror side, so that the electrodes of the lamp are heated to approximately the same degree.

Since the amount of heat becomes larger as the electrode of the lamp receives more electrons, one of the electrodes, which sends out more electric power, is heated more than the other electrode, which receives the electric power. In this case, it is necessary to heat the electrodes of the lamp to approximately the same degree, so that electric energy that flows to the electrode arranged in the mirror side from the other electrode, which is more heated (one of the electrodes, which is provided far from the mirror side), is made slightly smaller than the electric energy, which flows from the electrode arranged in the mirror side to the other electrode. In addition, when the lamp is horizontally arranged, since the difference between the amount of heating of one of electrodes and that of the other electrode is smaller than the difference therebetween in case where the lamp is vertically arranged, a ratio A/B of the electric energy B, which flows from the electrode arranged in the mirror side of the lamp to the other electrode, to electric energy A, which flows from the other electrode to the electrode arranged in the mirror side, is set to be larger than an electric energy ratio A'/B' in case where the lamp described below is vertically arranged. In addition, an example where the electric energy, which flows from one of electrodes to the other electrode is different from the electric energy, which flows from the other electrode to the one of electrodes, is applied to not only the case of the above-mentioned reflective mirrors, but also a case where a light source apparatus is equipped with an optical element, which returns light to the inside of an arc tube. As the example where light is returned to the arc tube, there is a case where, for example, when light passes through a color wheel, part of the light is reflected and returned to the arc tube. Moreover, there is another example where light, which is returned to the arc tube, wherein when one of sealing portions is provided with a first reflective mirror so that light is reflected in a light emitting direction and the other sealing portion is provided with a second reflective mirror so that the light is reflected in a direction opposite to the light emitting direction.

Vertical Arrangement (Vertical Lighting)

As shown in FIG. 2, one electrode 14a of a pair of electrodes, which are provided in a high pressure discharge lamp, is arranged in a lamp upper side in the gravity direction, and the other electrode 14b is arranged in a lamp lower side in the gravity direction (in an up and down direction in FIG. 2). When the electrodes are arranged in the up and down direction (the gravity direction), the electrode located in the upper side gets hotter than the electrode 14b arranged in the lower side during lighting, since a heat convection arises inside an arc tube. As mentioned above, the amount of heating to an electrode becomes larger as electric energy, which is sent out from the electrode, becomes larger. Therefore, when alternating current electric power (current) is supplied so that the electric energy, which flows from the electrode 14a arranged in the upper side to the electrode 14b arranged in the lower side, may become smaller than the electric energy, which flows from the electrode 14b arranged in the lower side to the electrode 14a arranged in the upper side, the amount of heating to the electrode 14a arranged in the upper side can make smaller than that of the electrode 14b arranged in the lower side. Thus, even if the vertical arranged lamp is lighted and the upper side electrode 14a is heated by the heat convection, the amount of heating to the electrode 14a can be suppressed by electric energy to be supplied to that electrode, so that damage to or loss of the electrode 14a is suppressed.

For this reason, when a signal, which indicates a state where the lamp 10 is vertically arranged, is inputted in the control circuit 50 from the detection circuit 30, the control circuit 50 controls the power supply apparatus 20, as shown in FIG. 4B, so that the electric energy that flows from the electrode arranged in the upper side to the electrode arranged in the lower side may become smaller than the electric energy that flows from the electrode arranged in the lower side to the electrode arranged in the upper side. In addition, in FIG. 4B, a plus side shows a current, which flows from the electrode arranged in the upper side to the electrode arranged in the lower side, and a minus side shows a current, which flows from the electrode arranged in the lower side to the electrode arranged in the upper side (they are the same as those in the following figures showing waveforms). Moreover, as mentioned above, it is desirable that, either in the case where the lamp is vertically arranged or in the case where the lamp is horizontally arranged, the polarity change cycle of the electric power (current), which flows through the lamp, is maintained to be the same as each other. For this reason, when the lamp 10 is vertically arranged, the control unit 50 makes the electric energy that flows from the electrode arranged in the upper side to the electrode arranged in the lower side may become smaller than the electric energy that flows from the electrode arranged in the lower side to the electrode arranged in the upper side, while the same cycle as the polarity change cycle in the case where the lamp is horizontally arranged is maintained. Here, a ratio A'/B' of the electric energy B', which flows from the electrode arranged in the lower side of the lamp 10 to the electrode arranged in the upper side, to electric energy A', which flows from the electrode arranged in the upper side to the electrode arranged in the lower side, is set to be smaller than the electric energy ratio A/B when the lamp is horizontally arranged. As mentioned above, this is because the amount of heating to one electrode (the upper electrode), in the case where the lamp is vertically arranged, is larger than that of the case where the lamp is horizontally arranged.

In the circuit of FIG. 3, as mentioned above, the electric power control unit 52c of the control unit 50 controls the switching element Qx of the step down chopper circuit 1 according to the signal given from the detection circuit 30, which indicates that the lamp 10 is vertically arranged, so that the electric energy that flows from the electrode arranged in the upper side to the electrode arranged in the lower side may become smaller than the electric energy that flows from the electrode arranged in the lower side to the electrode arranged in the upper side. Moreover, in case where the drive signal generation unit 51 of the control unit 50 is given a synchronization signal from the time division element 40, the driver 4 is driven according to this synchronization signal, and the switching cycle of the switching elements Q1-Q4 of the full bridged circuit 2 is controlled, so that the polarity change of the electric power, which flows into the lamp 10, is performed in synchronization with the synchronization signal. As a result, alternating current is supplied, so that the electric energy, which flows from the electrode arranged in the upper side to the electrode arranged in the lower side, becomes smaller than the electric energy, which flows from the electrode arranged in the lower side to the electrode arranged in the upper side and the heating of the upper side electrode is suppressed.

In addition, although a description of the electric energy in the case of a vertical arrangement lighting and a horizontal arrangement lighting is not given above, the lamp electric powers may be changed to be different from each other in the vertical arrangement lighting and the horizontal arrangement lighting, as described below. For example, when the electric power is 200 W at the time of vertical lighting, the electric power at the time of horizontal lighting is set to 190 W, which is 95% or less of 200 W, so that since the amount of current, which flows through both the upper side electrode and the lower side electrode decreases, so that heating of both electrodes can be suppressed, whereby damage to or loss of both electrodes is suppressed.

Figures 5A, 5B:
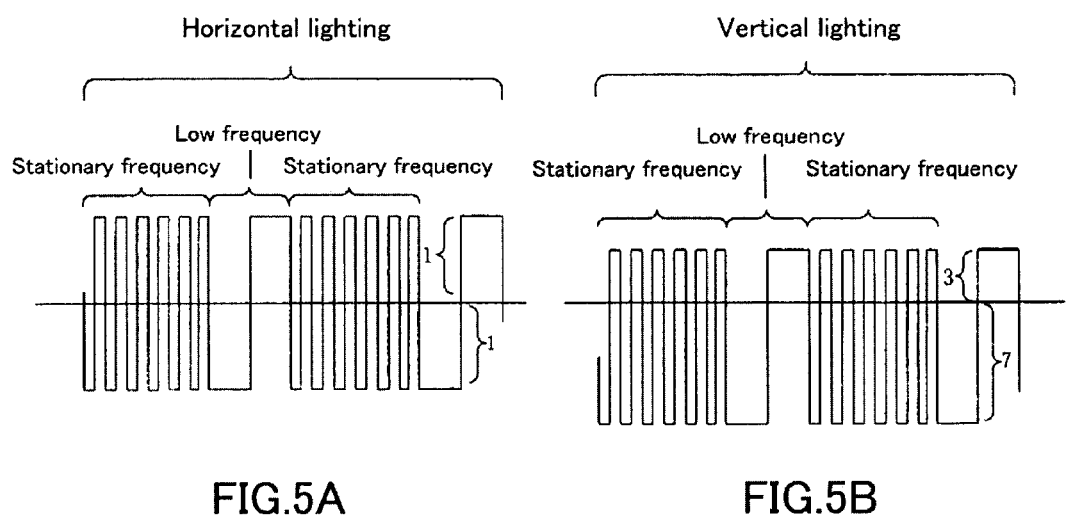
FIGS. 5A and 5B respectively show current waveforms, which flow through a lamp of a light source apparatus according to the present invention, wherein a low frequency waveform whose frequency is lower than a stationary frequency is periodically inserted.

Although FIGS. 4A and 4B show examples, in which an alternating current of constant frequency (stationary frequency) whose duty ratio is 1:1 flows through the lamp and the low frequency waveform whose frequency is lower than the stationary frequency may be inserted therein, as disclosed in Japanese Patent Application Publication No. 2007-087637. FIGS. 5A and 5B respectively show current waveforms, which flow through a lamp of a light source apparatus according to the present invention, wherein a low frequency waveform whose frequency is lower than a stationary frequency is periodically inserted. Specifically, FIG. 5A shows the case of a horizontal lighting (when electric energy, which flows from one electrode to the other electrode and electric energy, which flows from the other electrode to the one electrode are approximately the same as each other), and FIG. 5B shows the case of a vertical lighting. Thus, as disclosed in Japanese Patent Application Publication No. 2007-087637, it is possible to suppress the generation of an unnecessary projection on electrodes by inserting low frequency waveform therein. In this case, for example, a low frequency waveform is periodically inserted, while the lamp is lighted at stationary frequency of 60 Hz-1000 Hz. The low frequency is lower than the stationary frequency and is selected from a range of 5 Hz-200 Hz. Moreover, the number of the waves inserted is selected from a range of 1 to 10 units, wherein a half cycle is regarded as one unit. Furthermore, intervals, at which the waves are inserted in the stationary frequency, are selected from a range of 0.01-120 seconds.

When the low frequency is inserted, as mentioned above, the control unit 50 controls the electric energy of the lamp according to the arrangement state of the lamp. That is, when a lamp is horizontally arranged, as shown in FIG. 5A, the electric energy that flows from the one electrode to the other electrode is set to be approximately the same as the electric energy that flows from the other electrode to the one electrode. In addition, as mentioned above, the electrodes may be heated to approximately the same degree by setting the electric energy, which flows from the one electrode to the other electrode to be slightly larger than the electric energy, which flows from the other electrode to the one electrode. Moreover, as shown in FIG. 5B, when the lamp is vertically arranged, control is performed so that the electric energy that flows from the electrode arranged in the upper side of the lamp to the electrode, which is arranged in the lower side thereof, is set to be smaller than the electric energy, which flows from the electrode arranged in the lower side to the electrode arranged in the upper side. Moreover, while a polarity change cycle is maintained to be the same as that at time when the lamp is horizontally arranged, a ratio A'/B' of the electric energy B', which flows from the electrode arranged in the lower side of the lamp to the electrode arranged in the upper side, to electric energy A', which flows from the electrode arranged in the upper side to the electrode arranged in the lower side, is set to be smaller than the ratio A/B of electric energy (a ratio of the electric energy B, which flows from the other electrode to the one electrode, to electric energy A, which flows from the one electrode to the other electrode, in case where the lamp is horizontally arranged). As mentioned above, heating of both electrodes can be suppressed by controlling the electric energy, which flows through the lamp, so that damage to the both electrodes can be suppressed. Furthermore, as described above, it is possible to suppress the generation of unnecessary projections on electrodes by inserting low frequency waveform therein.

A description of when a synchronization signal is inputted into the control circuit 50 from the time division element 40 when a color wheel is used, will be given below. As disclosed in Japanese Patent Application Publication No. 2007-165067, in the light source apparatus according to the present invention, light outputted from the lamp is sometimes emitted toward such a color wheel. The color wheel is also called a rotation filter and is made from disk-like glass. Areas of red (R), green (G), blue (B), and white (W) are formed in the filter in shape of a fan, respectively. The light, which is outputted from the lamp, passes through a light collecting area, which is formed on the color wheel. While the color wheel is rotated, the light passes through a color area, which faces the light collecting area, so that each color is emitted. Here, for example, when the color wheel is rotated at 180 Hz (180 revolutions per second), the light passes through each of the red (R) green (G), blue (B), and white (W) areas by 180 times.

When the color wheel is used in this way, as mentioned above, it is desirable to change the polarity of the alternating current electric power (current), which flows through the lamp at (each) area change timing, to not produce a flicker on a screen. In the light source apparatus shown in FIGS. 1 and 3, a synchronization signal, which is in synchronization with each area change timing of the color wheel, is inputted into the control unit 50 from the time division element 40. The control unit 50 drives the driver 4 according to the above-mentioned synchronization signal, and the switching cycle of the switching elements Q1-Q4 of the full bridged circuit 2 is controlled, whereby the polarity change of the electric power, which flows through the lamp 10, is performed, in synchronization with the synchronization signal.

Figures 6A, 6B:
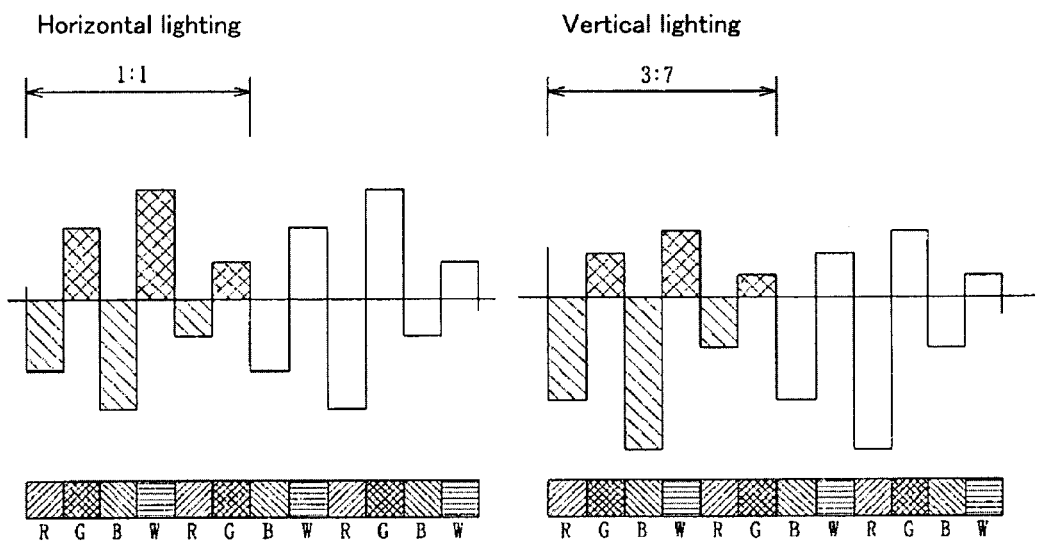
FIGS. 6A and 6B show a first example of current waveforms, which flow through a lamp of a light source apparatus, and switching timing of areas of a color wheel.

FIGS. 6A and 6B show a first example of current waveforms, which flow through a lamp of a light source apparatus, and switching timing of areas of a color wheel. Further, FIGS. 6A and 6B show a current, which flows between electrodes of a lamp and change timing of each of areas R, G, B, and W of a color wheel, in the case where the color wheel is used. Also, FIGS. 6A and 6B show a case where the duty ratio of the current, which flows through the lamp is set to 1:1. As shown in FIGS. 6A and 6B, when such a color wheel is used, the polarity of the alternating current electric power (current), which flows through the lamp, is switched in synchronization with the area change timing of the color wheel.

That is, as shown in FIG. 6A, when the lamp is horizontally arranged, while the polarity of the alternating current electric power (current), which flows through the lamp, is switched in synchronize with the area change timing of the color wheel, control is performed so that electric energy that flows from one electrode to the other electrode is set to be approximately the same as the electric energy that flows from the other electrode to the one electrode. In addition, in FIG. 6A, although the duty ratio of the current, which flows through the lamp, is set to 1:1, a vertical axis, that is, the amount of the current differs depending on cycles. This is because the amount of current for each color of the color wheel is changed to adjust the color reproducibility of an image, which is formed when light passes through the color wheel, or brightness thereof. That is, the amount of current of red (R) or blue (B) in the image to be formed, is improved (adjusted) to improve the color reproducibility of the image, and the amount of current of green (G) or white (W) is improved (adjusted) to improve the brightness, so that the current varies in each cycle. Even if current varies in each cycle, since the electric energy, which flows from the one electrode to the other electrode is set to be approximately equal to the electric energy, which flows the other electrode to the one electrode in a predetermined period, the electric energy per unit time, which flows from the one electrode to the other electrode becomes approximately equal to the electric energy, which flows through the other electrode to the one electrode. That is, in FIG. 6A, the total area of the plus side with hatching and that of the minus side with another hatching are approximately equal. In addition, as mentioned above, in this case, the electric energy, which flows from the other electrode to the one electrode, is set to be slightly larger than the electric energy, which flows from the one electrode to the other electrode, whereby the electrodes of the lamp may be heated to approximately the same degree.

Moreover, as shown in FIG. 6B, when the lamp is vertically arranged, while the polarity of the alternating current electric power (current), which flows through the lamp, is changed in synchronization with the area switching timing of the color wheel, control is performed so that the electric energy that flows from the electrode arranged in the upper side to the electrode arranged in the lower side becomes smaller than the electric energy that flows from the electrode arranged in the lower side to the electrode arranged in the upper side. Moreover, as described above, while a polarity change cycle, which is the same as that in case where the lamp is horizontally arranged, is maintained, a ratio A'/B' of the electric energy B', which flows from electrode arranged in the lower side of the lamp to the electrode arranged in the upper side, to electric energy A', which flows from the electrode arranged in the upper side to the electrode arranged in the lower side, is set to be smaller than a ratio A/B (of electric energy B, which flows from the other electrode to one electrode, to electric energy A, which flows from the one electrode to the other electrode in a case where the lamp is horizontally arranged).

In addition, in FIG. 6B, although the duty ratio of current, which flows through a lamp, is set to 1:1, a vertical axis, that is, the amount of the current varies depending on cycles, similarly to those of FIG. 6A. This is because the figure shows a lamp current when where the lamp voltage changes, as described above. In this case, for the electric energy in each cycle to suppress damage to the electrodes, electric energy that flows from the electrode arranged in the upper side to the electrode arranged in the lower side is smaller than the electric energy that flows from the electrode arranged in the lower side to the electrode arranged in the upper side. In this case, for example, the ratio of the electric energy that flows from the electrode arranged in the upper side to the electrode arranged in the lower side to the electric energy that flows from the electrode arranged in the lower side to the electrode arranged in the upper side is set to 3:7, and the electric energy per unit is set to 3:7, in the same manner as the amount of current. That is, the ratio of the area of minus side with the hatching and that of the plus side with another hatching shown in FIG. 6B is set to 3:7. As described above, damage to both electrodes can be suppressed by controlling the electric energy, which flows through the lamp. Moreover, it is possible to match timing of polarity change of current with area switching timing of the color wheel, so that an image can be displayed without producing a flicker on a screen.

In addition, the width of segments in the color wheel is not necessarily fixed. FIGS. 7A and 7B show a second example of current waveforms, which flow through a lamp of a light source apparatus, and switching timing of areas of a color wheel. That is, as shown in FIGS. 7A and 7B, there are wide areas (R and W in the figure), and narrow areas (G and B in the figure). For example, in FIGS. 7A and 7B, time T is set as one cycle, and time width of each area is set to T1, T2, T3, and T. In this case, it is desirable to perform the polarity change of lamp current according to area change timing of the color wheel. In this case, a duty ratio is not necessarily 1:1. For this reason, in the case of horizontal lighting, polarity change timing of the lamp current is controlled according to the width of each segment of the color wheel. Moreover, control is performed so that electric energy that flows from one electrode to the other electrode is set to be approximately the same as the electric energy that flows from the other electrode to the one electrode. For example, in FIG. 7A, the amplitude of current that flows from one electrode to the other electrode and the amplitude of the current that flows from the other electrode to the one electrode are controlled within one cycle T of R, G, B, and W, so that electric energy that flows from one electrode to the other electrode is set to be approximately the same as the electric energy that flows from the other electrode to the one electrode.

Moreover, although at time of vertical lighting, polarity change timing is controlled according to the width of the segment of the color wheel to be the same as the case of horizontal lighting, as described above, control is performed at the same time within one cycle T of R, G, B, and W in FIG. 7B, so that the electric energy that flows from the electrode arranged in the upper side to the electrode arranged in the lower side is smaller than the electric energy that flows from the electrode arranged in the lower side to the electrode arranged in the upper side. For example, in FIG. 7B, the ratio of the amount of current that flows from an electrode arranged in the upper side to an electrode arranged in a lower side to the amount of current that flows from the lower electrode to the upper electrode is set to 3:7 in each cycle T. The electric energy per unit time is also set to, for example, 3:7 in the same manner as the amount of current. That is, the ratio of the area of the minus side with hatching and that of the plus with another hatching shown in FIG. 7B is set to 3:7. Thus, for example, when the color wheel is used, a duty ratio is not necessarily 1:1, so that it is necessary to define a duty ratio in accordance with of switching timing of each segment of the color wheel, and as shown in FIGS. 7A and 7B, a duty ratio at time of horizontal lighting and that at time of vertical lighting are in agreement, and the polarity change timing of current is matched with area change timing of a color wheel. Simultaneously, while the electric energy At the time of horizontal lighting is controlled to be approximately 1:1, the electric energy At the time of vertical lighting is controlled to be, for example, approximately 3:7. Thus, damage to electrodes is suppressed.

To confirm the effects of the present invention, an experiment was conducted, as set forth below. When a lamp was vertically arranged, a desirable value of a ratio of electric energy that flows from an electrode arranged in a lower side to an electrode arranged in an upper side to electric energy that flows from the electrode arranged in the upper side to the electrode arranged in the lower side was examined. As a result of the experiment, it is found out that the ratio is desirably 3:7 to 4.8:5.2.

EXPERIMENT 1

The present inventors prepared lamps shown in FIG. 2, and these lamps were vertically arranged and lighted. At that time, under various conditions, which were set for the ratio of electric energy, the shape of electrodes was observed after the lamp was lighted for two hundred hours. The electrode shape deformation (degree) at a ratio in each electric energy was compared with that of the electrode two hundred after hour horizontal lighting at the ratio of each electric energy. That is, the shape of the electrodes in the case where a ratio A'/B' of electric energy B', which flowed from an electrode arranged in a lower side of the lamp to an electrode arranged in an upper side, to electric energy A', which flowed from the electrode arranged in the upper side to the electrode arranged in the lower side, was changed variously and the lamp was lighted for two hundred hours, was compared with the shape of the electrodes in the case where, after two hundred hours horizontal lighting, the electric energy that flowed from one of the electrodes to the other electrode was set to be approximately equal to electric energy that flowed from the other electrode to the one of the electrodes.

The conditions of the experiment are set forth below. The maximum outer diameter of a silica glass discharge tube of the lamp used for the experiment, was φ11.3 mm. In a light emission section, mercury of 0.29 mg/mm$^3$, bromine gas of $3\times10^{-3}$ μmol/mm$^3$, and rare gas of 100 Torr were enclosed. Moreover, a distance between electrodes was 1.1 mm, and an electric power of 275 W was impressed at time of horizontal lighting. Further, an alternating current lighting was performed at frequency of 370 Hz. FIGS. 8A, 8B, and 8C respectively show an experimental result. In the table shown in FIGS. 8A, 8B, and 8C, a double circle (⊚) was given to the best level cases, that is, where the life characteristic at (start up) time in horizontal lighting could be maintained until the end of life. A circle (○) was given to the acceptable level cases, where a state was not the best level, but 80 to 90 percent of the life time of the conventional horizontal lighting may be maintained. A triangle symbol (Δ) was given to other acceptable level cases, where 70 percent of the life characteristic may be maintained. Moreover, a symbol (x) was given to not acceptable cases. In addition, the evaluation is based on a result where five lamps were used to averagely compare the shape of the electrodes of each lamp.

The result of the experiment 1 is shown in FIG. 8A. In FIGS. 8A, 8B, and 8C, an "Electric power ratio" is a ratio of the lamp electric power at time of vertical lighting and at time of horizontal lighting, which were targets to be compared. FIG. 8A shows a case where the electric power ratio at time of the vertical lighting and at the horizontal lighting was 1. At the time of vertical lighting, "Electric energy ratio" is a ratio of the electric energy that flowed from an electrode arranged in an upper side of a lamp to an electrode arranged in a lower side and the electric energy that flowed from the electrode arranged in the lower side to the electrode arranged in the upper side. They are shown as "Top" and the "Bottom", respectively. The "Shape of electrode" shows a deformation state of the shape of an upper side electrode and that of a lower side electrode and a result of collective evaluation of a deformation state of the shape of the upper side electrode and the lower side electrode. As described above, the results are shown by using a double circle (⊚), a circle (○), a triangle (Δ), and a symbol (x). As shown in FIG. 8A, when electric power at time of vertical lighting was the same (100%) as electric power at time of horizontal lighting, if the electric energy that flowed from the lower side electrode to the upper electrode was increased to, for example, 2.5:7.5, the lower side electrode received electrons to be heated so that the electrode was melted and deformed. Then, when the electric energy that flowed from the lower side electrode, was increased to more than 2.5:7.5, the deformation increase, so that expected life characteristic could not be acquired.

On the other hand, if both electric energy values were made the same, for example, 5:5, since the upper side electrode was heated due to heat convection, so that it was melted and deformed, when the electric energy that flowed from the upper side electrode to the lower side electrode was increased, the upper side electrode was further heated so that the expected life characteristic could not acquired. Therefore, when alternating current is supplied to the lamp so that the ratio of the electric energy that flows from the electrode (upper side electrode) arranged in the upper side to electrode (lower side electrode) arranged in the lower side to the electric energy that flows from the lower side electrode to the upper side electrode may be 3:7 to 4.8:5.2, the life characteristic of 70 percent or more can be acquired.

EXPERIMENT 2

Next, under the same lamp conditions, the electrode shape change was observed when electric power at time of vertical lighting was smaller than that at time of horizontal lighting (98% or less). As apparent from FIG. 8A, the electrodes started to deform when the ratio was increased and when the ratio was decreased (it changes, in an order of, for example, ○→Δ→x). That is, the electrode starts to deformed from approximately the above-mentioned ratio of 4/6 (as a center), even if a ratio becomes larger and smaller. Thus, to examine the applied power conditions where electrode shape was stabilized more, the ratio of 4/6 was fixed, and the ratio of the electric power at time of vertical lighting to electric power at time of horizontal lighting was changed from 100% to 95%. The electrode shape deformation degree was observed.

The experimental result is shown in FIG. 8B. As shown in FIG. 8B, the ratio of the electric energy, which flowed from the upper side electrode to the lower side electrode, to the electric energy, which flowed from the lower side electrode to the upper side electrode, was set to 4:6, and the shape of the electrode was respectively observed when the electric power ratio in vertical lighting/horizontal lighting was changed in the range of 100% to 95%. When the electric power ratio was 95%, a level equivalent to the life characteristic in horizontal lighting was maintained. Then, the electric power ratio of vertical lighting/horizontal lighting is fixed to 95%, the ratio of the electric energy, which flowed from the electrode arranged in the upper side to the electrode arranged in the lower side, to the electric energy, which flowed from the electrode arranged in the lower side to the electrode arranged in the upper side was changed, and the deformation state of the electrode shape was examined. The result is shown in FIG. 8C.

As shown in FIG. 8C, in the case of other electric energy ratio, the electrode shape was improved. This is because the electric energy, which flowed from the upper side electrode to the lower side electrode, became low by lowering electric energy inputted in the horizontal lighting, compared with that in vertical lighting, so that heating to both electrodes decreased. The above experiment shows that it is desirable to set the electric power ratio of vertical lighting/horizontal lighting to 95% or less to more effectively suppress the deformation of the shape of the electrode. In addition, if lighting electric power of a lamp is set to 5 to 10% or less of electric power at time of stationary lighting, the temperature of the electrode drops and thermoelectronic emission from a cathode becomes unstable, so that blackening and light-out of the lamp may occur due to glow discharge. Therefore, the electric power ratio of vertical lighting/horizontal lighting is desirably set to 5% (preferably 10%)-95%.

The preceding description has been presented only to illustrate and describe exemplary embodiments of the present light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source apparatus comprising:
a high pressure discharge lamp;
a power supply apparatus that supplies an alternating current to the lamp, the power supply apparatus comprises a switching element;
a control circuit that outputs a control signal to the power supply apparatus;
the control circuit receives a timing signal for a switching timing of an area of a color wheel or a synchronization signal that is a time divisional signal for a refresh rate of a liquid crystal, controls a switching cycle of the switching element, and switches polarity of power supplied to the lamp;

the lamp comprises a one electrode that faces an other electrode;

when the lamp is horizontally arranged, the power supply apparatus sets a ratio A/B of an electric energy A to an electric energy B and supplies an alternating current, the polarity of which is synchronously changed according to the synchronization signal, wherein the electric energy B flows to the one electrode from the other electrode, the electric energy A flows from the one electrode to the other electrode;

when the lamp is vertically arranged, the power supply apparatus sets an electric energy A' that flows from one of the electrodes arranged in a lamp upper side to another one of the electrodes arranged in a lamp lower side to be smaller than electric energy B' that flows from the electrode arranged in the lower side to the electrode arranged in the upper side, the power supply apparatus further sets a ratio A'/B' of the electric energy A' to the electric energy B', wherein the ratio A'/B' is smaller than the ratio A/B, and supplies an alternating current, the polarity of which is synchronously changed according to the synchronization signal.

2. The light source apparatus according to claim 1, wherein the ratio A'/B' is set to 3/7 to 8/5.2.

3. The light source apparatus according to claim 1, wherein an inputted electric power when the lamp is vertically arranged is 95% or less of an inputted electric power when the lamp is horizontally arranged.

4. The light source apparatus according to claim 1, wherein the ratio A'/B' is set while a polarity change cycle is a cycle when the ratio A/B is set.

5. The light source apparatus according to claim 1, wherein the high pressure discharge lamp further comprises a container that encases mercury and the one electrode and the other electrode.

6. The light source apparatus according to claim 1, wherein the apparatus further comprises a detection circuit that detects whether the lamp is horizontally arranged or vertically arranged.

* * * * *